United States Patent
Kemmerling et al.

(10) Patent No.: US 11,725,611 B2
(45) Date of Patent: Aug. 15, 2023

(54) AFTERTREATMENT HEAT MANAGEMENT BY CONTROLLED EXHAUST-GAS RECIRCULATION WITH VARIABLE CO-CURRENT FLOW UPSTREAM OF FIRST CATALYST

(71) Applicant: Ford Global Technologies, LLC, Dearborn, MI (US)

(72) Inventors: Joerg Kemmerling, Monschau (DE); Michael Forsting, Moenchengladbach (DE); Frank Wunderlich, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/063,423

(22) Filed: Dec. 8, 2022

(65) Prior Publication Data

US 2023/0193860 A1    Jun. 22, 2023

(30) Foreign Application Priority Data

Dec. 20, 2021    (DE) ..................... 10 2021 133 784.4

(51) Int. Cl.

| | |
|---|---|
| *F02M 26/15* | (2016.01) |
| *F02M 26/05* | (2016.01) |
| *F02M 26/06* | (2016.01) |
| *F02D 41/00* | (2006.01) |
| *F02M 26/00* | (2016.01) |

(52) U.S. Cl.
CPC ......... *F02M 26/15* (2016.02); *F02D 41/0055* (2013.01); *F02M 26/05* (2016.02); *F02M 26/06* (2016.02); *F02D 2041/0067* (2013.01); *F02D 2200/0802* (2013.01); *F02M 2026/004* (2016.02)

(58) Field of Classification Search
None
See application file for complete search history.

(56) References Cited

U.S. PATENT DOCUMENTS

2009/0183496 A1    7/2009    Arakawa et al.

FOREIGN PATENT DOCUMENTS

| | | | |
|---|---|---|---|
| DE | 102019122917 | * | 3/2021 |
| DE | 102019122917 A1 | | 3/2021 |
| JP | 2006257920 A | | 9/2006 |
| KR | 100301659 B1 | | 10/2001 |

* cited by examiner

*Primary Examiner* — Mickey H France
*Assistant Examiner* — Edward Bushard
(74) *Attorney, Agent, or Firm* — Vincent Mastrogiacomo; McCoy Russell LLP

(57) ABSTRACT

Methods and systems are provided for an exhaust system. In one example, the exhaust system includes an aftertreatment device and a recirculation passage. A recirculation valve is positioned in the recirculation passage and configured to control an amount of recirculated exhaust gas flowing through the recirculation passage to the aftertreatment device. The exhaust system further includes a diverter valve configured to control a flow of engine exhaust gases to different portions of a catalyst of the aftertreatment device.

20 Claims, 3 Drawing Sheets

AFTERTREATMENT HEAT MANAGEMENT BY CONTROLLED EXHAUST-GAS RECIRCULATION WITH VARIABLE CO-CURRENT FLOW UPSTREAM OF FIRST CATALYST

CROSS REFERENCE TO RELATED APPLICATION

The present application claims priority to German Patent Application No. 10 2021 133 784.4 filed on Dec. 20, 2021. The entire contents of the above-listed application is hereby incorporated by reference for all purposes.

FIELD

The present description relates generally to an exhaust-gas purification device of an internal combustion engine arrangement having at least one catalytic exhaust-gas treatment unit and having an exhaust-gas recirculation section for conveying at least a proportion of an exhaust-gas flow from a location arranged downstream of the catalytic exhaust-gas treatment unit to a location arranged upstream of the catalyst substrate into the catalytic exhaust-gas treatment unit.

BACKGROUND/SUMMARY

In the field of the purification of exhaust gas of internal combustion engines for the purposes of compliance with legal regulations, catalytic converters for exhaust-gas aftertreatment may be used. Pollutants such as hydrocarbons (HC), carbon monoxide CO and/or nitrogen oxides $NO_x$ may be reduced into carbon dioxide $CO_2$, nitrogen $N_2$, and water using catalytically active substances, for example noble metals such as platinum, rhodium or palladium, which are applied to substrate materials within the catalytic converter.

Controlled 3-way catalytic converters are widely used for the purification of exhaust gas from gasoline engines. For diesel engines, the use of diesel oxidation catalytic converters (DOC) for reducing carbon monoxide and hydrocarbons in the exhaust gas is known. To remove nitrogen oxides from the exhaust gas of diesel engines, NO storage catalytic converters and SCR (selective catalytic reduction) catalytic converters, in which a urea solution is injected for the purposes of reducing the nitrogen oxide to form nitrogen and water may be used. A removal of soot particles from the exhaust gas of diesel engines may be performed using diesel particle filters (DPF), which may be regenerated via the stored soot being burned off at predetermined temperatures.

A challenge for exhaust-gas purification using catalytic converters consists in that, upon a cold start of the internal combustion engine, the catalytically active substances are below their light-off temperature.

In previous example solutions, there have been proposals for bringing catalytic converters to operating temperatures above their light-off temperature more quickly.

For example, US 2009/0183496 A1 teaches an exhaust-gas purification device, comprising an exhaust-gas pipe that forms an exhaust-gas channel in which an exhaust gas emitted by an internal combustion engine flows, comprising a catalytic converter unit with a catalytic converter arranged in the exhaust-gas line, comprising a catalytic converter temperature detection device that can detect a temperature of the catalytic converter arranged in the catalytic converter unit, and comprising a throttle unit, which is arranged in at least one of an upstream side and a downstream side of the catalytic converter unit and by means of which exhaust gas flowing in the exhaust-gas line can be introduced into only one part of the catalytic converter unit if the temperature of the catalytic converter as detected by the catalytic converter temperature detection device is lower than an activation temperature of the catalytic converter. This control can quickly increase the temperature of the catalytic converter within a short time period of the starting of a diesel internal combustion engine. The throttle unit has a first and a second plate-like valve element, which are pivotable independently of one another within an exhaust-gas passage in order to cover or open up a respective part of a cross section of the exhaust-gas passage. When the catalytic converter reaches its activation temperature, the throttle unit commands a first and a second valve element to fully open. This reduces a pressure loss of the exhaust gas, because the exhaust gas is supplied to the entire catalytic converter.

It is furthermore known that for a proportion of the exhaust gas of the internal combustion engine, after it has flowed through the catalytic converter or the catalytic converters, to be recirculated to the catalytic converter under certain operating conditions of the internal combustion engine, for example upon a cold start. The recirculated exhaust gas causes the exhaust-gas mass flow through the cold catalytic converter components to be increased, resulting also in an increased introduction of heat into the cold catalytic converter components. In this way, a desired light-off temperature of a catalytic converter can be reached, or can stabilize, more quickly.

For example, KR 100301659 B1 teaches a device for purifying the exhaust gas of internal combustion engines. The device improves an efficiency of purification of the exhaust gas by recirculating the exhaust gas during a cold start and before an activation of the catalytic converter, and (ii) by activating a catalytic converter reaction through simultaneous introduction of secondary air.

This device for purifying an exhaust gas comprises a catalytic converter for purifying the exhaust gas by way of a catalyst, a secondary air feed device, an exhaust-gas recirculation pipe, and an exhaust-gas-switching thermal element. During a cold start of the engine, ambient air is introduced via the secondary air feed device, in order to increase the oxygen concentration of the exhaust gas that is introduced into the catalytic converter, using a negative pressure effect that results from the outflow of the exhaust gas. Upon a cold start of the engine, the exhaust gas passing through the catalytic converter is recirculated through the exhaust-gas pipe to a front inlet of the catalytic converter. In the non-activated state of the catalytic converter, the exhaust-gas-switching thermal element is operated by thermal deformation such that the exhaust gas that is conducted through the catalytic converter is not discharged to the rear but is recirculated through the exhaust-gas recirculation pipe.

Furthermore, JP 2006-257920 A describes an exhaust-gas emissions control device. The exhaust-gas emissions control device comprises an oxidation catalytic converter, which is arranged on an upstream side of the exhaust gas, a particle filter body with a wall-flow structure, which is arranged on the downstream side of the oxidation catalytic converter, and an exhaust-gas recirculation device for feeding at least a proportion of the outlet gas of the oxidation catalytic converter between the oxidation catalytic converter and the particle filter body into the exhaust gas on the upstream side of the oxidation catalytic converter. The exhaust-gas recirculation device may be formed by connecting the exhaust-gas channel upstream of the oxidation catalytic converter body and the exhaust-gas channel on the downstream side, forming a bypass channel that bypasses the oxidation catalytic converter body, and arranging a pump so as to feed the exhaust gas from the downstream side to the upstream side of the oxidation catalytic converter body through the bypass channel.

Since at least a proportion of the outlet gas of the oxidation catalytic converter passes through the oxidation catalytic converter by way of the exhaust-gas recirculation device, the temperature of the exhaust gas flowing in the particle filter body will increase, and the $NO_2$ concentration increases, thus promoting the oxidation and natural combustion of the particles that have been deposited on the particle filter body. It is thus made possible for the particle filter body to be continuously regenerated, whilst at the same time an increase of the pressure loss is prevented. As a result of an increase of the temperature of the oxidation catalytic converter body, the oxidation activity is further improved, and the purification rates for hydrocarbons (HC) and CO are improved.

Other examples disclose an exhaust-gas treatment system, comprising an oxidation catalytic converter, in particular diesel oxidation catalytic converter, which is configured to receive exhaust gas generated by an internal combustion engine, in particular diesel internal combustion engine, and warm exhaust gas flowing through the oxidation catalytic converter, comprising a particle filter, in particular diesel particle filter, which is configured to receive the warmed exhaust gas, and comprising a recirculation loop, which is configured to receive a proportion of the heated exhaust gas downstream of the oxidation catalytic converter and to feed this to the proportion of the exhaust gas downstream of the internal combustion engine and upstream of the oxidation catalytic converter, wherein the recirculation loop is furthermore configured to increase a temperature of the oxidation catalytic converter to above a light-off temperature in order to enable a regeneration of the particle filter. The exhaust-gas treatment system may have a fuel injection nozzle that is configured to inject fuel into the flow channel upstream of the oxidation catalytic converter in order to initiate an exothermic reaction that warms exhaust gas flowing through the oxidation catalytic converter.

One or more components of the exhaust-gas treatment system may comprise one or more pumps, compressors or other systems that are configured to enable exhaust-gas recirculation through the recirculation loop. Valves, branches, coolers, heaters and/or other devices may furthermore be used to modify the exhaust-gas flow as desired.

Furthermore, DE 10 2019 122 917 A1 proposes an internal combustion engine arrangement comprising an internal combustion engine, a supercharger with a compressor and a turbine, an exhaust-gas recirculation device with a NO storage catalytic converter, and a low-pressure exhaust-gas recirculation flow channel with an inlet downstream of the exhaust-gas aftertreatment device. A flow channel is provided which branches off from the low-pressure exhaust-gas recirculation flow channel and which comprises a first valve, a blower arranged downstream of the first valve, a heater arranged downstream of the blower, and an outlet arranged upstream of the exhaust-gas aftertreatment device, which outlet leads into an exhaust-gas flow channel downstream of the turbine of the supercharger.

If a demand for regeneration of the NO storage catalytic converter is detected and the torque or the load of the internal combustion engine falls below a set threshold value, the low-pressure exhaust-gas recirculation valve is closed, and the internal combustion engine is optionally operated with high-pressure exhaust-gas recirculation. The internal combustion engine can continue to be operated with lean combustion, whereby noticeable torque fluctuations are avoided. Based on a combustion air ratio detected directly upstream of the NO storage catalytic converter, a certain quantity of fuel is injected via a fuel injector into the exhaust-gas flow channel directly upstream of the NO storage catalytic converter in order to generate a rich fuel-air mixture. At the same time, a first valve is opened and the blower is activated in order to achieve a high exhaust-gas recirculation flow, whereby the quantity of fuel to be injected can be minimized. Via the recirculation of hot exhaust gas, the exothermic reactions within the exhaust-gas treatment device can be advantageously utilized to increase the efficiency of the regeneration of the NO storage catalytic converter. The exhaust-gas recirculation can be controlled through suitable setting of the opening of the exhaust-gas valve.

In one example, the issues described above may be addressed by a system for an exhaust recirculation passage configured to inject filtered exhaust gas from downstream of an aftertreatment device to upstream of the aftertreatment device based on a direction of exhaust gas flow and a valve configured to direct unfiltered exhaust gas to a first portion of a first catalyst and filtered exhaust gas to a second portion of the first catalyst of the aftertreatment device when in a warm-up position. In this way, both portions of the first catalyst may be heated while the first portion is heated more rapidly to reduce emissions when the catalyst is not lit-off.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
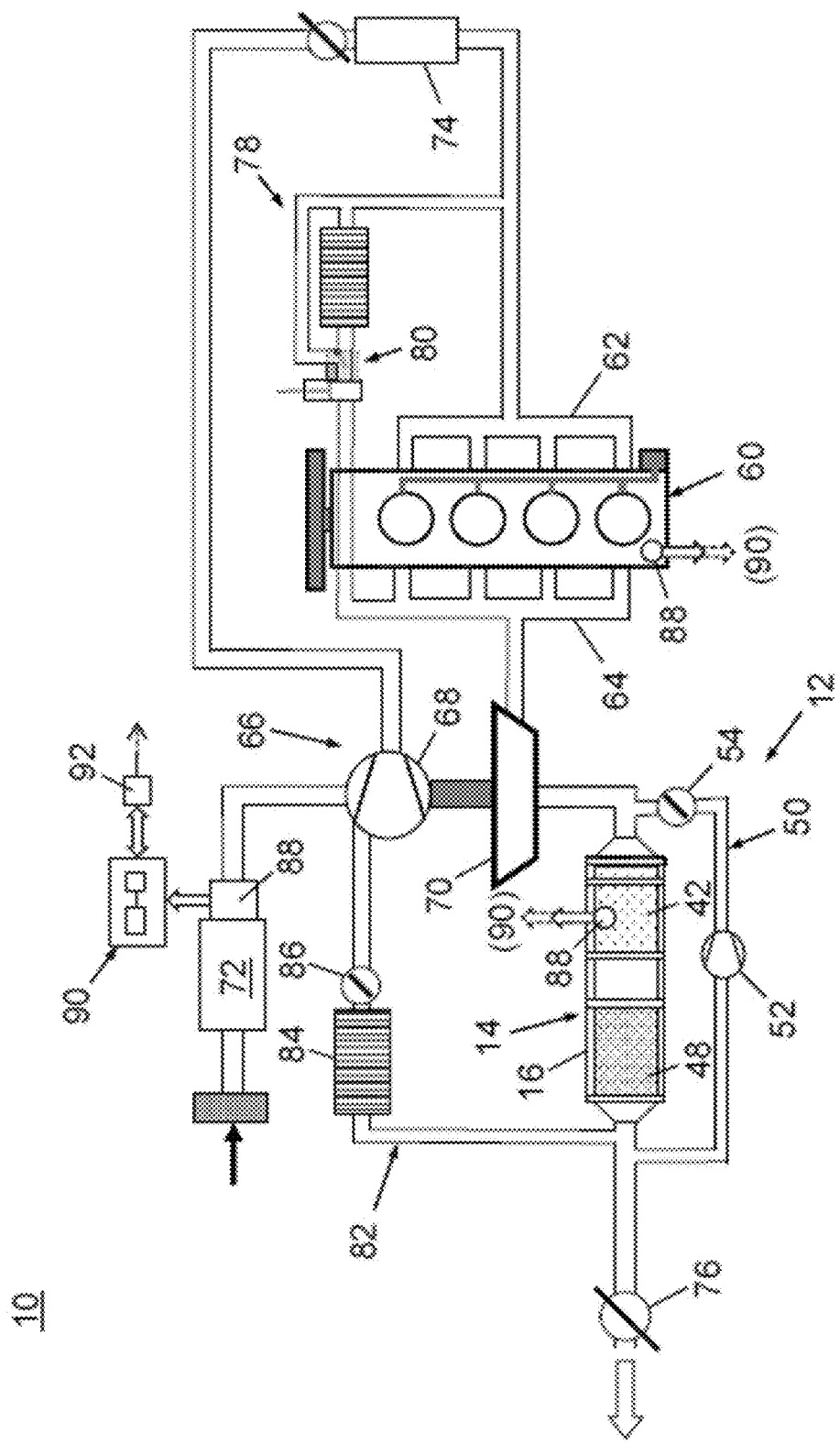
FIG. 1 is a schematic illustration of an arrangement of an internal combustion engine which is configured as a diesel internal combustion engine arrangement and which has an exhaust-gas purification device according to the disclosure.
Figure 2:
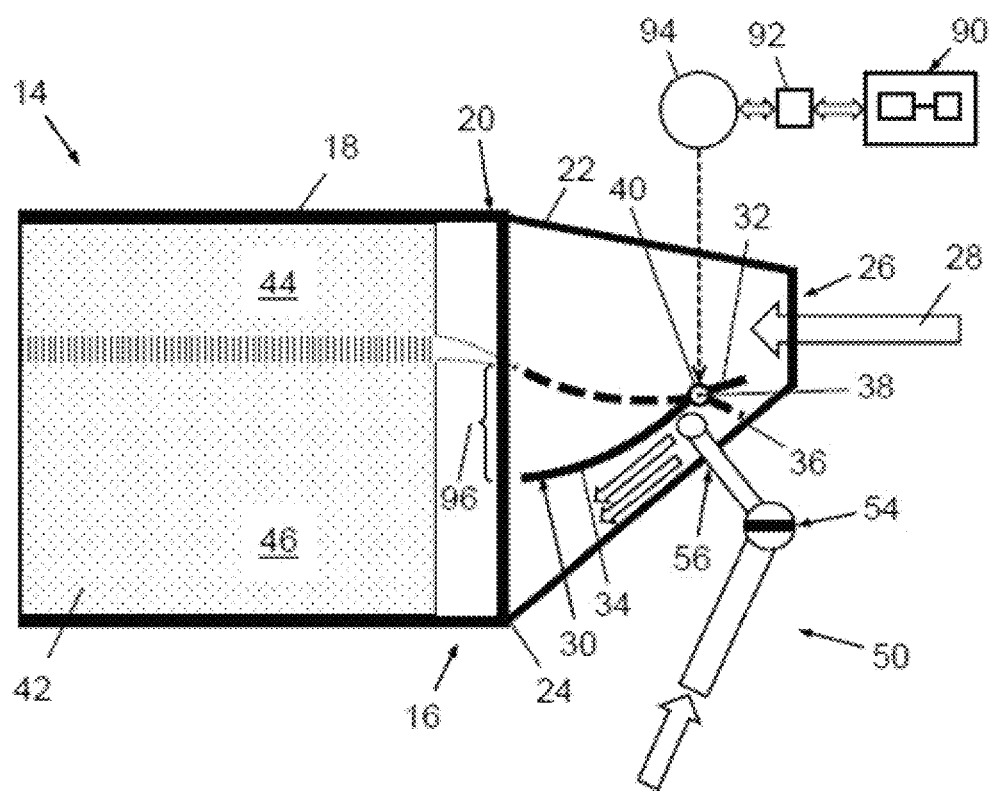
FIG. 2 is a schematic detail illustration of the exhaust-gas purification device according to the disclosure as per FIG. 1 in a plan view.
Figure 3:
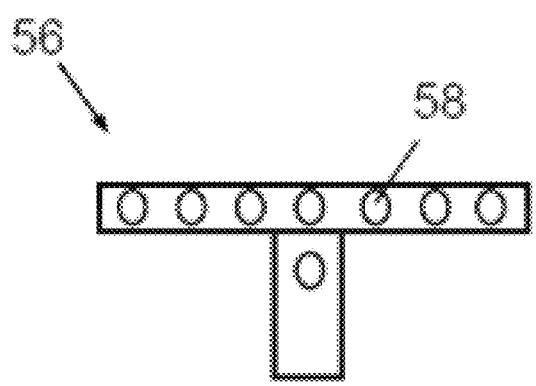
FIG. 3 shows a schematic front view of an exhaust-gas outlet unit of the exhaust-gas recirculation section of the exhaust-gas purification device as per FIG. 1.
Figure 4:
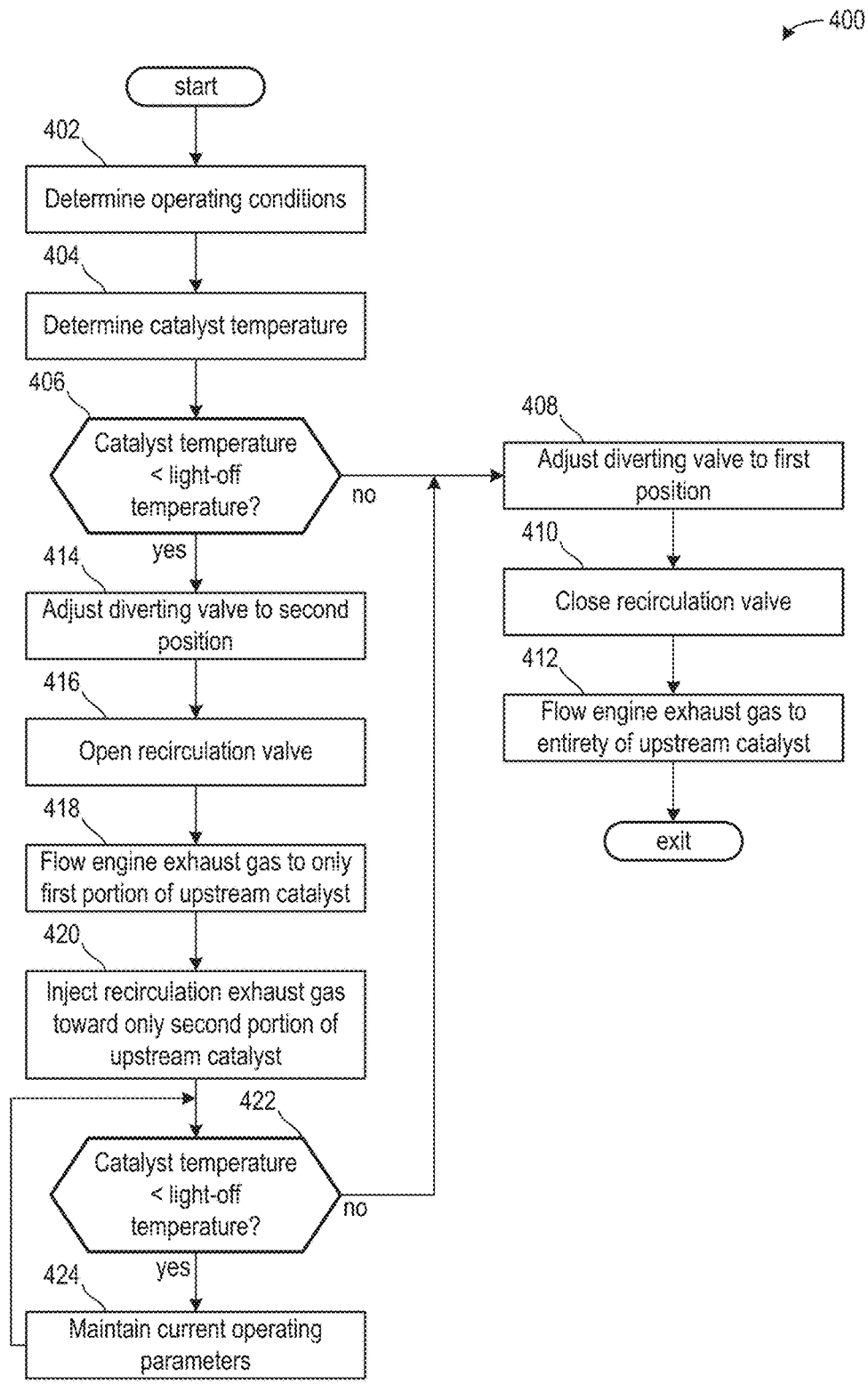
FIG. 4 shows a method for adjusting a position of a diverter valve positioned in an inlet of the exhaust-gas purification device.

The following description relates to systems and methods for an exhaust gas system. FIG. 1 is a schematic illustration of an arrangement of an internal combustion engine which is configured as a diesel internal combustion engine arrangement and which has an exhaust-gas purification device according to the disclosure. FIG. 2 is a schematic detail illustration of the exhaust-gas purification device according to the disclosure as per FIG. 1 in a plan view. FIG. 3 shows a schematic front view of an exhaust-gas outlet unit of the exhaust-gas recirculation section of the exhaust-gas purification device as per FIG. 1. FIG. 4 shows a method for adjusting a position of a diverter valve positioned in an inlet of the exhaust-gas purification device.

The disclosure provides support for an exhaust-gas purification device of an internal combustion engine arrangement, in particular with a diesel internal combustion engine, which exhaust-gas purification device, under cold-start conditions and/or low-load conditions, allows faster warming of catalytically active substances to temperatures equal to or above the light-off temperature thereof, and in so doing functions without a significant increase in $CO_2$ emissions.

Note that the features and measures individually specified in the following description may be combined with one another in any technically meaningful way and reveal further refinements of the disclosure. The description additionally characterizes and specifies the disclosure, in particular in conjunction with the figures.

The exhaust-gas purification device according to the disclosure of an internal combustion engine arrangement comprises at least one catalytic exhaust-gas treatment unit with a housing and with at least one catalytically active catalyst substrate arranged in the housing, and comprising an exhaust-gas recirculation section that is provided for controllably conveying at least a proportion of an exhaust-gas flow from a location arranged downstream of the exhaust-gas treatment unit to a location arranged upstream of the catalyst substrate into the exhaust-gas treatment unit.

Here, the catalytic exhaust-gas treatment unit has a rigid diverting plate which is mounted in the housing so as to be controllably pivotable about a virtual pivot axis at least between a cold position and a warm position, wherein the virtual pivot axis runs transversely with respect to a flow direction of the exhaust gas flowing into the exhaust-gas treatment unit and parallel to a surface of the diverting plate. The rigid diverting plate furthermore has a plate part upstream of the virtual pivot axis and a plate part downstream of the virtual pivot axis, wherein the plate part upstream of the virtual pivot axis, in the cold position, partially covers an inlet flow cross section of the exhaust-gas treatment unit upstream of the catalyst substrate, and the plate part downstream of the virtual pivot axis forms, for the inflowing exhaust gas, a diverting element for diversion onto a partial region of the catalyst substrate.

In the context of the present disclosure, the expression "provided for" is to be understood in particular to mean specially programmed, configured or arranged for the purpose. In the context of the present disclosure, the expression "catalyst substrate" is to be understood to encompass, but not be limited to, a diesel oxidation catalytic converter, a NO storage catalytic converter and an SCR catalytic converter.

Via the proposed rigid diverting plate situated in the cold position, it is possible in one suitable refinement, during exhaust-gas recirculation, for example upon a cold start of the internal combustion engine, for mixing of the recirculated proportion of the exhaust-gas flow and of the exhaust gas presently flowing from the internal combustion engine into the catalytic exhaust-gas treatment unit to be substantially prevented, and for the exhaust gas presently flowing from the internal combustion engine into the catalytic exhaust-gas treatment unit to be concentrated on one part of the catalytically active catalyst substrate.

Since the exhaust gas presently flowing from the internal combustion engine into the catalytic exhaust-gas treatment unit is hotter than the recirculated exhaust gas and flows through only one part of the catalytically active catalyst substrate, both the temperature of the inflowing exhaust gas and an exhaust-gas mass flow in relation to the catalytic converter area are increased, whereby a desired light-off temperature can be reached more quickly in this part of the catalytically active catalyst substrate.

The recirculated exhaust-gas flow, which is somewhat colder than the presently inflowing exhaust gas, can be used to warm the remaining part of the catalytically active catalyst substrate. The remaining part of the catalytically active catalyst substrate however also experiences a temperature increase owing to a heat flow from the direction of that part of the catalyst substrate which is heated by the exhaust gas presently flowing from the internal combustion engine into the catalytic exhaust-gas treatment unit. It is thus achieved overall that the entire catalytically active catalyst substrate can be brought to the desired light-off temperature in a shorter time. Here, it is possible to omit an injection and conversion of fuel into the catalytic exhaust-gas treatment unit, such that an increase in $CO_2$ emissions is avoided.

The proposed exhaust-gas purification device can be used even under low-load conditions of the internal combustion engine, for example during a relatively long idling phase in a traffic queue. Owing to the greater exhaust-gas mass flow, in relation to the catalytic converter area, at relatively high temperature, the exhaust gas presently flowing from the internal combustion engine into the catalytic exhaust-gas treatment unit can maintain that part of the catalytically active catalyst substrate through which it flows at or above the light-off temperature, and prevent a deactivation as a result of cooling. The recirculated exhaust-gas flow, which is colder than the presently inflowing exhaust gas, continues to warm the remaining part of the catalytically active catalyst substrate. In this way, a complete deactivation of the catalytic exhaust-gas treatment unit can be avoided, and optimum operating conditions of the catalytic exhaust-gas treatment unit can be attained more quickly.

In some embodiments of the exhaust-gas purification device, the exhaust-gas recirculation has an exhaust-gas outlet unit which is arranged in the housing upstream of the catalyst substrate and which is arranged downstream of the virtual pivot axis. In this way, mixing of the recirculated proportion of the exhaust-gas flow and of the exhaust gas presently flowing from the internal combustion engine into the catalytic exhaust-gas treatment unit can be prevented in a particularly simple manner in terms of design.

The exhaust-gas outlet unit includes a multiplicity of outlet nozzles, the outlet openings of which are oriented downstream. In the context of the present disclosure, the expression "multiplicity" is to be understood in particular to mean a number of at least two. In this way, a lateral flow, or a flow directed upstream, of the recirculated proportion of the exhaust-gas flow can be substantially prevented, and mixing of the recirculated proportion of the exhaust-gas flow and of the exhaust gas presently flowing from the internal combustion engine into the catalytic exhaust-gas treatment unit can be prevented in a particularly effective manner.

In additional embodiments of the exhaust-gas purification device, at least the plate part upstream of the virtual pivot axis is, in the cold position, adapted to a contour of an inner surface part of the housing. Via the proposed adaptation, an effective separation of the recirculated proportion of the exhaust-gas flow and of the exhaust gas presently flowing from the internal combustion engine into the catalytic exhaust-gas treatment unit can be achieved, and the mixing thereof can be prevented in a particularly effective manner.

In one example, the plate part downstream of the virtual pivot axis for diverting the inflowing exhaust gas onto the partial region of the catalyst substrate has a concave curvature facing toward the inflowing exhaust gas. In this way, a change in momentum can be imparted to the inflowing exhaust gas in a particularly simple manner in terms of design, which change in momentum counteracts mixing with the recirculated proportion of the exhaust-gas flow.

In some embodiments of the exhaust-gas purification device, the rigid diverting plate that is mounted so as to be pivotable about the virtual pivot axis is controllable into any position between the cold position and the normal-operation position. By assuming a position between the cold position and the normal-operation position, it is possible to variably divide up the catalytically active catalyst substrate into a part through which the recirculated exhaust gas flows and a part through which the exhaust gas presently flowing from the internal combustion engine into the catalytic exhaust-gas treatment unit flows. Via the provided facility for variably dividing up the catalytically active catalyst substrate, the warming thereof can be adapted to prevailing ambient temperature conditions and/or to load conditions of the internal combustion engine.

The catalytic exhaust-gas treatment unit preferably comprises at least one of a diesel oxidation catalytic converter and a NO storage catalytic converter, and optionally comprises a downstream diesel particle filter. Exhaust-gas purification devices configured in this way can be used in diesel internal combustion engine arrangements.

In some embodiments of the exhaust-gas purification device, the housing has a first housing part with an elliptical cross-sectional area for accommodating the catalytically active catalyst substrate and has a second, frustoconical housing part for accommodating the pivotably mounted, rigid diverting plate, which second housing part, by way of an edge of the larger base, adjoins an upstream end of the first housing part. In this embodiment, particularly favorable space and flow conditions can be provided for a mounting of the rigid diverting plate and for a definition of the cold position and of the warm position.

The expressions "first", "second" etc. used in the present application serve merely for the purposes of distinction. In particular, the use thereof is not intended to imply a sequence or priority of the objects mentioned in conjunction with these expressions.

In a further aspect of the present disclosure, a diesel internal combustion engine arrangement is proposed which has a diesel internal combustion engine and which is equipped with an embodiment of the exhaust-gas purification device according to the disclosure. The diesel internal combustion engine arrangement furthermore comprises a sensor unit for the ascertainment of physical variables that characterize the operating conditions of the exhaust-gas purification device and of the diesel internal combustion engine, and an electronic control unit with at least one actuator. The electronic control unit is operatively connected to the sensor unit and is provided to control at least the pivotably mounted, rigid diverting plate into a predetermined position via the at least one actuator in a manner dependent on a predetermined selection of the variables ascertained by the sensor unit.

In the various figures, identical parts are always denoted by the same reference designations, for which reason said parts will generally also be described only once.

Turning now to FIG. 1, it shows a schematic illustration of one possible embodiment of an internal combustion engine arrangement 10 with an exhaust-gas purification device 12 according to the disclosure. Herein, the exhaust-gas purification device 12 may be interchangeably referred to as an aftertreatment device. In the present embodiment, the internal combustion engine arrangement 10 is configured as a diesel internal combustion engine arrangement, with a diesel internal combustion engine 60 as internal combustion engine 60.

The internal combustion engine arrangement 10 comprises the internal combustion engine 60 with inlet manifold 62 and outlet manifold 64, a turbocharger 66 with a compressor part 68 (e.g., compressor housing and wheel) for pressurizing air, and a turbine part 70 (e.g., turbine housing and wheel) which is arranged on a common shaft with the compressor part 68 and which is provided for being driven by exhaust gas flowing out of the internal combustion engine 60. The compressor part 68 is configured to draw in air from the surroundings through an air filter 72 and introducing said air in compressed form, via a charge-air cooler 74 for cooling the air after compression, into the inlet manifold 62 of the internal combustion engine 60.

The internal combustion engine arrangement 10 furthermore comprises a high-pressure exhaust-gas recirculation device 78 which is connected between the outlet manifold 64 and the inlet manifold 62 and which has a high-pressure exhaust-gas recirculation (HP-EGR) valve 80.

The internal combustion engine arrangement 10 is equipped with the exhaust-gas purification device 12, which is arranged between the downstream end of the turbine part 70 of the turbocharger 66 and an outlet non-return flap valve 76. The exhaust-gas purification device 12 comprises a catalytic exhaust-gas treatment unit 14. The catalytic exhaust-gas treatment unit 14 has a metallic housing 16 and has a catalytically active catalyst substrate 42 arranged in the housing 16. The catalytically active catalyst substrate 42 is configured as a diesel oxidation catalytic converter which is arranged at the upstream side in the housing 16 and which is followed downstream by a diesel particle filter 48 that is integrated with the diesel oxidation catalytic converter in the housing 16. A device upstream of another device receives gases prior to the other device. Thus, a device downstream of another device receives gases after the other device. Herein the catalytically active catalyst substrate 42 may be interchangeably referred to as a first catalyst and/or an upstream catalyst. The diesel particle filter 48 may be interchangeably referred to as a second catalyst and/or a downstream catalyst, herein. In some examples, the diesel particle filter 48 may include a selective catalytic reduction (SCR) device disposed thereon such that it is configured as a sDPF.

The exhaust-gas purification device 12 furthermore comprises an exhaust-gas recirculation section 50 which has an electrically operable turbomachine 52, which may be configured as a fan, a pump, or compressor, and a control valve 54. The control valve 54 may be interchangeably referred to herein as a recirculation valve. The exhaust-gas recirculation section 50 is arranged between a downstream end of the housing 16 of the catalytic exhaust-gas treatment unit 14 and a location in the catalytic exhaust-gas treatment unit 14 which is arranged upstream of the catalytically active catalyst substrate 42. The exhaust-gas recirculation section 50 is provided for controllably conveying a proportion of the exhaust-gas flow from the location arranged downstream of the catalytic exhaust-gas treatment unit 14 to the location arranged upstream of the catalytically active catalyst substrate 42 into the catalytic exhaust-gas treatment unit 14.

In one example, exhaust gases flowing to the upstream catalyst from the engine may be referred to herein as unfiltered exhaust gas or engine exhaust gas. Exhaust gases flowing to the upstream catalyst from a recirculation passage of the exhaust-gas recirculation section 50 may be referred to herein as filtered exhaust gas or recirculated exhaust gas. In some embodiments, a catalyst may be arranged between the upstream catalyst and the engine.

The internal combustion engine 10 comprises a low-pressure exhaust-gas recirculation device 82, which is arranged between a downstream end of the housing 16 of the catalytic exhaust-gas treatment unit 14 and the compressor part 68 of the turbocharger 66 and which comprises an exhaust-gas cooler 84 and an exhaust-gas recirculation valve 86. The internal combustion engine 10 may be operated both with the high-pressure exhaust-gas recirculation device 78 and with the low-pressure exhaust-gas recirculation device 82.

Turning now to FIG. 2, it shows the upstream end of the housing 16 of the catalytic exhaust-gas treatment unit 14 in a schematic plan view. The housing 16 has a first housing part 18 with an elliptical cross-sectional area for accommodating the catalytically active catalyst substrate 42 and the diesel particle filter 48 (shown in FIG. 1) and has a second, hollow, frustoconical housing part 22 which, by way of an edge 24 of the larger base, adjoins an upstream end 20 of the first housing part 18 and is fixedly connected thereto, for example via a welded connection. The smaller base of the second, frustoconical housing part 22 forms an upstream inlet opening 26 for exhaust gas 28 presently flowing out of the internal combustion engine 60 and being conducted through the turbine part 70 of the turbocharger 66.

The catalytic exhaust-gas treatment unit 14 comprises a rigid diverting plate 30 which is accommodated and arranged, and mounted so as to be pivotable about a virtual pivot axis 38, within the cavity formed by the second housing part 22. The virtual pivot axis 38 runs transversely with respect to a flow direction of the exhaust gas 28 flowing into the catalytic exhaust-gas treatment unit 14, and parallel to a surface of the rigid diverting plate 30. In the illustration of FIG. 2, the virtual pivot axis 38 is arranged perpendicular to the plane of the drawing and the direction of exhaust gas 28.

The rigid diverting plate 30 is mounted so as to be controllable from outside the housing 16. For this purpose, it is for example possible for at least one end of a pivot 40 which is mounted in the second housing part 22 and which is fixedly connected to the rigid diverting plate 30 to be led through at least one outer side of the second housing part 22 to the outside, such that access to the mounted pivot 40 and thus to the rigid diverting plate 30 is possible.

The upstream end of the exhaust-gas recirculation section 50 is led through the outer side of the second housing part 22 to the inside, and has an exhaust-gas outlet unit 56 which is arranged within the second housing part 22 and configured as a T-shaped injector, upstream of the catalytically active catalyst substrate 42. The exhaust-gas outlet unit 56 is arranged downstream of the virtual pivot axis 38 and has a multiplicity of outlet nozzles 58, shown in FIG. 3, the outlet openings of which are oriented downstream toward the catalytically active catalyst substrate 42. In on example, the plurality of outlet nozzles 58 may direct recirculated exhaust gas or filtered exhaust gas from the recirculation passage in a direction parallel to an inner surface of the inlet toward a second portion of the upstream catalyst. The exhaust-gas outlet unit 56 may include a first body that is normal to a second body, wherein the plurality of outlet nozzles 58 are arranged on each of the first and second body. The first and second body may form a T-shape or a cross-shape.

Referring again to FIG. 2, the rigid diverting plate 30 is mounted so as to be controllably pivotable between a cold position and a warm position, wherein the rigid diverting plate 30 is controllable, within an adjustment range 96, into any position between the cold position and the warm position. The warm position of the rigid diverting plate 30 is depicted in FIG. 2 by a solid line, whereas the cold position of the rigid diverting plate 30 is indicated by a dashed line.

The rigid diverting plate 30 has a plate part 32 upstream of the virtual pivot axis 38 and a plate part 34 downstream of the virtual pivot axis 38. In one example, the plate part 32 is a first plate part misaligned with the plate part 34, which is a second plate part. In one example, the first plate part may be linear and the second plate part may be curved. The first plate part may be angled relative to the second plate part.

As shown in FIG. 2, in the cold position, the plate part 32 upstream of the virtual pivot axis 38 partially covers an inlet flow cross section of the catalytic exhaust-gas treatment unit 14 upstream of the catalytically active catalyst substrate 42. The plate part 32 upstream of the virtual pivot axis 38 is, in the cold position, adapted to a contour of an inner surface part 36 of the housing 16.

It is thus achieved that, in the cold position of the rigid diverting plate 30, the exhaust gas 28 presently flowing from the internal combustion engine 60 (via the turbine part 70 of the turbocharger 66) into the catalytic exhaust-gas treatment unit 14 is prevented from flowing into that part of the inlet flow cross section which is covered by the plate part 32 upstream of the virtual pivot axis 38. Mixing of the exhaust gas 28 presently flowing from the internal combustion engine 60 to the catalytic exhaust-gas treatment unit 14 with the recirculated proportion of the exhaust-gas flow emerging from the exhaust-gas outlet unit 56 therefore practically does not occur.

In one example, when in the cold position, the first plate part 32 touches the inner surface part 36 and block exhaust gases from flowing to the exhaust-gas outlet unit 56. When in the warm position, the first plate part 32 is spaced away from the inner surface part 36 and exhaust gases may flow to the exhaust-gas outlet unit 56.

To further assist the prevention of mixing, the plate part 34 downstream of the virtual pivot axis 38 has a concave curvature facing toward the presently inflowing exhaust gas 28. The plate part 34 downstream of the virtual pivot axis 38 forms a diverting element for the inflowing exhaust gas 28. This causes a change in momentum and change in direction of the inflowing exhaust gas 28, in the direction opposite to the covered part of the inlet flow cross section, onto a first partial region 44 of the catalytically active catalyst substrate 42. The flow of the exhaust gas 28 downstream of the rigid diverting plate 30 is indicated in FIG. 2 by dotted lines.

The exhaust gas 28 presently flowing from the internal combustion engine 60 into the catalytic exhaust-gas treatment unit 14 thus flows only through one part of the catalytically active catalyst substrate 42, specifically the first partial region 44. The temperature of the presently inflowing exhaust gas 28, which is higher than that of the recirculated exhaust-gas flow, and the increased exhaust-gas mass flow in relation to the catalytic converter area have the effect that a desired light-off temperature can be reached more quickly in this part of the catalytically active catalyst substrate 42.

When the rigid diverting plate 30 is in the cold position, the recirculated exhaust-gas flow, which is somewhat colder than the presently inflowing exhaust gas 28, is used to warm a second partial region 46 of the catalytically active catalyst substrate 42. Because the mixing of the exhaust gas 28 presently flowing from the internal combustion engine 60 into the catalytic exhaust-gas treatment unit 14 and the recirculated exhaust-gas flow is prevented in the cold position, the first partial region 44 is warmed more quickly than the second partial region 46 of the catalytically active catalyst substrate 42. A temperature difference that consequently arises results in a heat flow from the first partial region 44 into the second partial region 46 of the catalytically active catalyst substrate 42, which is thereby additionally warmed. The overall result is a shorter time to reach the desired light-off temperature in the catalytically active catalyst substrate 42 as a whole.

As can furthermore be seen from FIG. 2, in the warm position, the plate part upstream 32 of the virtual pivot axis 38 is adapted to a direction of the exhaust gas 28 presently flowing from the internal combustion engine 60 into the catalytic exhaust-gas treatment unit 14, and therefore does not constitute a significant flow resistance. The exhaust gas 28 presently flowing from the internal combustion engine 60 into the catalytic exhaust-gas treatment unit 14 can thus flow unhindered through the entire catalytically active catalyst substrate 42.

During operation where the catalyst is lit-off (e.g., a temperature of the catalyst is greater than a threshold temperature), in which the catalytically active catalyst substrate 42 of the catalytic exhaust-gas treatment unit 14 is at or above the desired light-off temperature, the control valve 54 of the exhaust-gas recirculation section 50 can be closed in order that the exhaust gas 28 presently flowing from the internal combustion engine 60 into the catalytic exhaust-gas treatment unit is prevented from ingressing into the exhaust-gas recirculation section 50.

In the present exemplary embodiment, the position of the rigid diverting plate 30 of the exhaust-gas purification device 12 is automatically controlled. The diesel internal combustion engine 60 is equipped with a sensor unit with sensors 88 for ascertaining physical variables (FIG. 1) that characterize the operating conditions of the exhaust-gas purification device 12 and of the diesel internal combustion engine 60. These may include, but are not limited to, the following physical variables: operating temperature of the diesel internal combustion engine 60, temperature of the catalytically active catalyst substrate 42, mass flow of the ambient air drawn in by the compressor part 68 of the turbocharger 66, and present power of the diesel internal combustion engine 60.

The diesel internal combustion engine 60 furthermore has an electronic control unit 90 with an actuator 92. The actuator 92 is operatively connected to a mechanical adjusting unit, for example a stepper motor 94, which mechanically engages with the pivot 40, which pivot is mounted in the second housing part 22 and is fixedly connected to the rigid diverting plate 30.

The electronic control unit 90 may have a digital data memory unit and a processor unit with access to the digital data memory unit. The steps to be executed by the electronic control unit 90 may be present in the form of a computer program that is stored in the digital data memory unit as instructions for executing a method, wherein the commands stored in the computer program can be executed by the processor unit.

The electronic control unit 90 is provided for identifying a predetermined setpoint position of the rigid diverting plate 30 in a manner dependent on a predetermined selection of the variables ascertained by the sensors 88 of the sensor unit, for example the operating temperature of the diesel internal combustion engine 60, the temperature of the catalytically active catalyst substrate 42 and the present power of the diesel internal combustion engine 60. This may be implemented for example via predetermined conversion tables (lookup tables) that are stored in the digital data memory unit. After the predetermined setpoint position has been identified, the electronic control unit 90 is provided for controlling the rigid diverting plate 30 into the predetermined setpoint position by means of the actuator 92 and the mechanical adjusting unit.

In one example, the systems of FIGS. 1-3 show an embodiment of an exhaust system comprising a close-coupled aftertreatment device coupled to a recirculation system. The recirculation system recirculates exhaust gas from downstream of a downstream catalyst of the aftertreatment device to a position upstream of an upstream catalyst. In one example, the upstream catalyst is a diesel oxidation catalyst (DOC) and the downstream catalyst is a SCR catalyst on a diesel particulate filter (sDPF). A reductant injector may be positioned between the upstream catalyst and the downstream catalyst and configured to inject toward an upstream surface of the downstream catalyst.

The recirculation system may include a boost device configured to increase a pressure of recirculated exhaust gases from downstream of the downstream catalyst to upstream of the upstream catalyst. The recirculation system may include a recirculation valve configured to control an injection rate of exhaust gases toward the upstream catalyst. A rotatable baffle (e.g., the diverting plate 30) may be rotated to block mixing between engine exhaust gas and recirculated exhaust gas. Engine exhaust gas is defined as exhaust gas from the engine that has not flowed through the aftertreatment device whereas the recirculated exhaust gas has flowed through the aftertreatment device and is redirected to upstream of the aftertreatment device. A temperature of engine exhaust gas is greater than a temperature of recirculated exhaust gas. Thus, in one example, it may be desired to minimize mixing between the engine exhaust gas and the recirculated exhaust gas during a cold-start or other condition. By doing this, a first portion of the upstream catalyst may be heated via only the engine exhaust gas and a second portion of the upstream catalyst may be heated via only the recirculated exhaust gas. Thus, the first portion may be heated more quickly than the second portion, while the second portion may still be heated via the recirculated exhaust gas, which may still improve a light-off time thereof. In this way, cold-start emissions or emissions due to the catalyst not being lit-off may be reduced.

In one example, the first portion of the catalyst may be smaller than the second portion of the catalyst. This may further increase a rate of temperature increase of the catalyst when its temperature is less than the light-off temperature. Additionally or alternatively, during idle or other lower exhaust mass flow conditions (e.g., braking, reduced engine load, and the like), only the first portion may receive engine exhaust gas via actuation of diverting plate.

Turning now to FIG. 4, it shows a method 400 for adjusting the diverting plate based on a temperature of the aftertreatment device. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 400 begins at 402, which may include determining operating conditions. Operating conditions may include one or more of, but are not limited to, an engine speed, a manifold pressure, a throttle position, a turbo speed, a vehicle speed, and an air/fuel ratio.

At 404, the method 400 may include determining a catalyst temperature. The catalyst temperature may be determined based on an exhaust gas temperature or estimated based on operating conditions. One or more temperature sensors may be positioned upstream and/or downstream of the aftertreatment, wherein feedback from the temperature sensors may be used to extrapolate various temperatures at different positions of the aftertreatment device. Additionally or alternatively, a temperature sensor may be embedded in a catalyst brick of the aftertreatment device.

At 406, the method 400 may include determining if the catalyst temperature is less than a light-off temperature. The light-off temperature may be based on a catalytically active temperature of the aftertreatment device. If the catalyst temperature is not less than the light-off temperature (e.g., greater than or equal to the light-off temperature), then at 408, the method 400 may include adjusting the diverting valve to the first position (e.g., the warm position).

At 410, the method 400 may include closing the recirculation valve. As such, recirculated exhaust gas may not flow through the recirculation passage to the aftertreatment device inlet cone. Additionally or alternatively, the compressor/boost device in the recirculation passage may be deactivated and current may not be supplied thereto.

At 412, the method 400 may include flowing engine exhaust gas to an entirety of the upstream catalyst. The first position of the diverting valve may allow engine exhaust gas to flow to each of the first and second portions of the upstream catalyst such that a temperature of each may be maintained at or above the light-off temperature.

Returning to 406, if the catalyst temperature is less than the light-off temperature, then at 414, the method 400 may include adjusting the diverting valve to the second position (e.g., the cold position). In the second position, the diverting valve may contact an inner surface of an inlet cone of the aftertreatment device, thereby blocking engine exhaust gas from flowing adjacent and parallel to the inner surface.

At 416, the method 400 may include opening the recirculation valve. As such, recirculated exhaust gas may be injected toward the second portion of the upstream catalyst.

At 418, the method 400 may include flowing engine exhaust gas to only the first portion of the upstream catalyst. The diverting valve may force the engine exhaust gas to only the first portion and block the engine exhaust gas from flowing to the second portion of the upstream catalyst. Additionally, by diverting the engine exhaust gas, it may block the engine exhaust gas from mixing with recirculated exhaust gas.

At 420, the method 400 may include injecting recirculation exhaust gas toward only the second portion of the upstream catalyst. The recirculated exhaust gas may be separated from the engine exhaust gas via the diverter valve. As such, a temperature gradient may form in the catalyst inlet and between the first portion and the second portion of the upstream catalyst. In one example, the upstream catalyst may be free of a shield or other barrier between the first portion and the second portion. As such, the temperature gradient may be based solely on the diverter valve directing exhaust gases and not a physical barrier. Additionally or alternatively, a barrier may physically separate the first portion from the second portion of the upstream catalyst.

At 422, the method 400 may include determining if the catalyst temperature is less than the light-off temperature. If the catalyst temperature is still less than the light-off temperature, then at 424, the method 400 may include maintaining current operating parameters, which includes maintaining the diverter valve in the second position (e.g., warm-up position).

If the catalyst temperature is no longer less than the light-off temperature, then the method 400 may proceed to 408 as described above.

The technical effect of the exhaust gas recirculation system is to accelerate warm-up of an entire catalyst while reducing emissions during a warm-up phase by more rapidly heating a portion of an aftertreatment system to which unfiltered engine exhaust is directed. A remaining portion of the aftertreatment system may receive recirculated exhaust gas that is filtered by the portion such that it may reach a corresponding light-off temperature than if it did not receive the recirculated exhaust gas.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The disclosure provides support for a system including an exhaust recirculation passage configured to inject recirculated exhaust gas from downstream of an aftertreatment device to upstream of the aftertreatment device based on a direction of exhaust gas flow and a valve configured to direct engine exhaust gas to a first portion of a first catalyst and recirculated exhaust gas to a second portion of the first catalyst of the aftertreatment device when in a cold position. A first example of the system further includes where the valve touches an inner wall of an inlet of the aftertreatment device when in the cold position. A second example of the system, optionally including the first example, further includes where the valve blocks engine exhaust gas from flowing to the second portion when in the cold position. A third example of the system, optionally including one or more of the previous examples, further includes where the valve is further configured to direct engine exhaust gas to each of the first portion and the second portion of the first catalyst when in a warm position. A fourth example of the system, optionally including one or more of the previous examples, further includes where the exhaust recirculation passage further comprises a boost device and a recirculation valve. A fifth example of the system, optionally including one or more of the previous examples, further includes where the boost device is active and the recirculation valve is open when the valve is in the cold position.

The disclosure provides further support for an exhaust system of an engine including an aftertreatment device comprising a first catalyst upstream of a second catalyst relative to a direction of exhaust gas flow, a diverter valve arranged in an inlet of the aftertreatment device, the diverter valve configured to move to a first position and a second position, a recirculation passage configured to flow exhaust gas from downstream of the aftertreatment device to the inlet of the aftertreatment device, the recirculation passage comprising a compressor upstream of a recirculation valve, and an injector downstream of the recirculation valve, and a controller with computer-readable instructions stored on memory thereof that when executed cause the controller to adjust the diverter valve to the first position in response to a temperature of the first catalyst being greater than or equal to a light-off temperature, and adjust the diverter valve to the second position in response to the temperature of the first catalyst being less than the light-off temperature. A first example of the exhaust system further includes where the diverter valve is in face-sharing contact with an interior surface of the inlet in the second position. A second example of the exhaust system, optionally including the first example, further includes where diverter valve comprises an arc-shaped portion and a linear portion, wherein the arc-shaped portion is longer than the linear portion. A third example of the exhaust system, optionally including one or more of the previous examples, further includes where the first catalyst includes a first portion and a second portion, wherein the first portion is smaller than the second portion. A fourth example of the exhaust system, optionally including one or more of the previous examples, further includes where exhaust gas from the recirculation passage flows to only the second portion. A fifth example of the exhaust system, optionally including one or more of the previous examples, further includes where exhaust gas from the recirculation passage is filtered, and wherein unfiltered exhaust gas from the engine is blocked from mixing with the filtered exhaust gas when the diverter valve is in the second position. A sixth example of the exhaust system, optionally including one or more of the previous examples, further includes where the instructions further cause the controller to activate the compressor and open the recirculation valve when the diverter valve is in the second position. A seventh example of the exhaust system, optionally including one or more of the previous examples, further includes where the injector comprises a plurality of openings facing the first catalyst. An eighth example of the exhaust system, optionally including one or more of the previous examples, further includes where the recirculation passage flows exhaust gas to a location of the inlet between the diverter valve and an inner wall of the inlet.

The disclosure provides additional support for a method including during a first condition, adjusting a diverter valve to a first position and flowing unfiltered exhaust gas to a first portion and a second portion of a catalyst and during a second condition, adjusting the diverter valve to a second position and flowing unfiltered exhaust gas to only the first portion of the catalyst and filtered exhaust gas to only the second portion of the catalyst. A first example of the method further includes where the first condition further comprises closing a recirculation valve in a recirculation passage coupled to an inlet of the catalyst, and where a temperature of the first portion of the catalyst is greater than or equal to a light-off temperature, wherein the first position comprises where the diverter valve is spaced away from an inner surface of the inlet of the catalyst. A second example of the method, optionally including the first example, further includes where the second condition further comprises opening the recirculation valve, and where the temperature of the first portion of the catalyst is less than the light-off temperature, wherein the second position comprises where the diverter valve is touching the inner surface of the inlet of the catalyst. A third example of the method, optionally including one or more of the previous examples, further includes blocking the unfiltered exhaust gas from mixing with the filtered exhaust gas via the diverter valve in the second position. A fourth example of the method, optionally including one or more of the previous examples, further includes injecting the filtered exhaust gas via a T-shaped injector comprising a plurality of openings toward only the second portion of the catalyst.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an exhaust recirculation passage configured to inject recirculated exhaust gas from downstream of an aftertreatment device to upstream of the aftertreatment device based on a direction of exhaust gas flow; and
a valve configured to direct engine exhaust gas to a first portion of a first catalyst and recirculated exhaust gas to a second portion of the first catalyst of the aftertreatment device when in a cold position.

2. The system of claim 1, wherein the valve is further configured to direct engine exhaust gas to each of the first portion and the second portion of the first catalyst when in a warm position.

3. The system of claim 1, wherein the valve touches an inner wall of an inlet of the aftertreatment device when in the cold position.

4. The system of claim 3, wherein the valve blocks engine exhaust gas from flowing to the second portion when in the cold position.

5. The system of claim 1, wherein the exhaust recirculation passage further comprises a boost device and a recirculation valve.

6. The system of claim 5, wherein the boost device is active and the recirculation valve is open when the valve is in the cold position.

7. An exhaust system of an engine, comprising:
an aftertreatment device comprising a first catalyst upstream of a second catalyst relative to a direction of exhaust gas flow;
a diverter valve arranged in an inlet of the aftertreatment device, the diverter valve configured to move to a first position and a second position;
a recirculation passage configured to flow exhaust gas from downstream of the aftertreatment device to the inlet of the aftertreatment device, the recirculation passage comprising a compressor upstream of a recirculation valve, and an injector downstream of the recirculation valve; and
a controller with computer-readable instructions stored on memory thereof that when executed cause the controller to:
adjust the diverter valve to the first position in response to a temperature of the first catalyst being greater than or equal to a light-off temperature; and
adjust the diverter valve to the second position in response to the temperature of the first catalyst being less than the light-off temperature.

8. The exhaust system of claim 7, wherein the diverter valve is in face-sharing contact with an interior surface of the inlet in the second position.

9. The exhaust system of claim 7, wherein the diverter valve comprises an arc-shaped portion and a linear portion, wherein the arc-shaped portion is longer than the linear portion.

10. The exhaust system of claim 7, wherein the instructions further cause the controller to activate the compressor and open the recirculation valve when the diverter valve is in the second position.

11. The exhaust system of claim 7, wherein the injector comprises a plurality of openings facing the first catalyst.

12. The exhaust system of claim 7, wherein the recirculation passage flows exhaust gas to a location of the inlet between the diverter valve and an inner wall of the inlet.

13. The exhaust system of claim 7, wherein the first catalyst includes a first portion and a second portion, wherein the first portion is smaller than the second portion.

14. The exhaust system of claim 13, wherein exhaust gas from the recirculation passage flows to only the second portion.

15. The exhaust system of claim 14, wherein exhaust gas from the recirculation passage is filtered, and wherein unfiltered exhaust gas from the engine is blocked from mixing with the filtered exhaust gas when the diverter valve is in the second position.

16. A method, comprising:
during a first condition, adjusting a diverter valve to a first position and flowing unfiltered exhaust gas to a first portion and a second portion of a catalyst; and
during a second condition, adjusting the diverter valve to a second position and flowing unfiltered exhaust gas to only the first portion of the catalyst and filtered exhaust gas to only the second portion of the catalyst.

17. The method of claim 16, further comprising blocking the unfiltered exhaust gas from mixing with the filtered exhaust gas via the diverter valve in the second position.

18. The method of claim 16, further comprising injecting the filtered exhaust gas via a T-shaped injector comprising a plurality of openings toward only the second portion of the catalyst.

19. The method of claim 16, wherein the first condition further comprises closing a recirculation valve in a recirculation passage coupled to an inlet of the catalyst, and where a temperature of the first portion of the catalyst is greater than or equal to a light-off temperature, wherein the first position comprises where the diverter valve is spaced away from an inner surface of the inlet of the catalyst.

20. The method of claim 19, wherein the second condition further comprises opening the recirculation valve, and where the temperature of the first portion of the catalyst is less than the light-off temperature, wherein the second position comprises where the diverter valve is touching the inner surface of the inlet of the catalyst.

* * * * *